W. J. Sager,
Corn Planter.
No. 113,936. Patented Apr. 18, 1871.

Witnesses
John A. Ellis
J. W. White

Inventor
Wm. J. Sager
per
T. K. Alexander
Atty.

United States Patent Office.

WILLIAM J. SAGER, OF MILESBURG, PENNSYLVANIA.

Letters Patent No. 113,936, dated April 18, 1871.

IMPROVEMENT IN CORN-PLANTERS.

The Schedule referred to in these Letters Patent and making part of the same.

*To all whom it may concern:*

Be it known that I, WILLIAM J. SAGER, of Milesburg, in the county of Centre and State of Pennsylvania, have invented certain new and useful Improvements in Corn-Planters; and I do hereby declare that the following is a full, clear, and exact description thereof, reference being had to the accompanying drawing and to the letters of reference marked thereon which form a part of this specification.

The nature of my invention consists in the construction and arrangement of a "corn-planter," as will be hereinafter more fully set forth.

In order to enable others skilled in the art to which my invention appertains to make and use the same, I will now proceed to describe its construction and operation, referring to the annexed drawing, in which—

Figure 1:
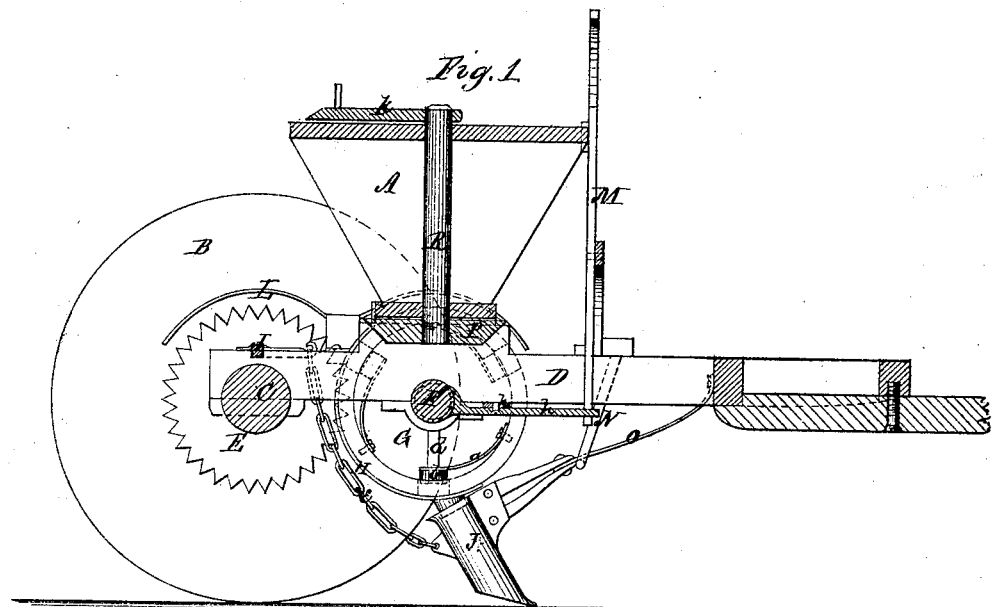

Figure 1 is a longitudinal vertical section, and

Figure 2:
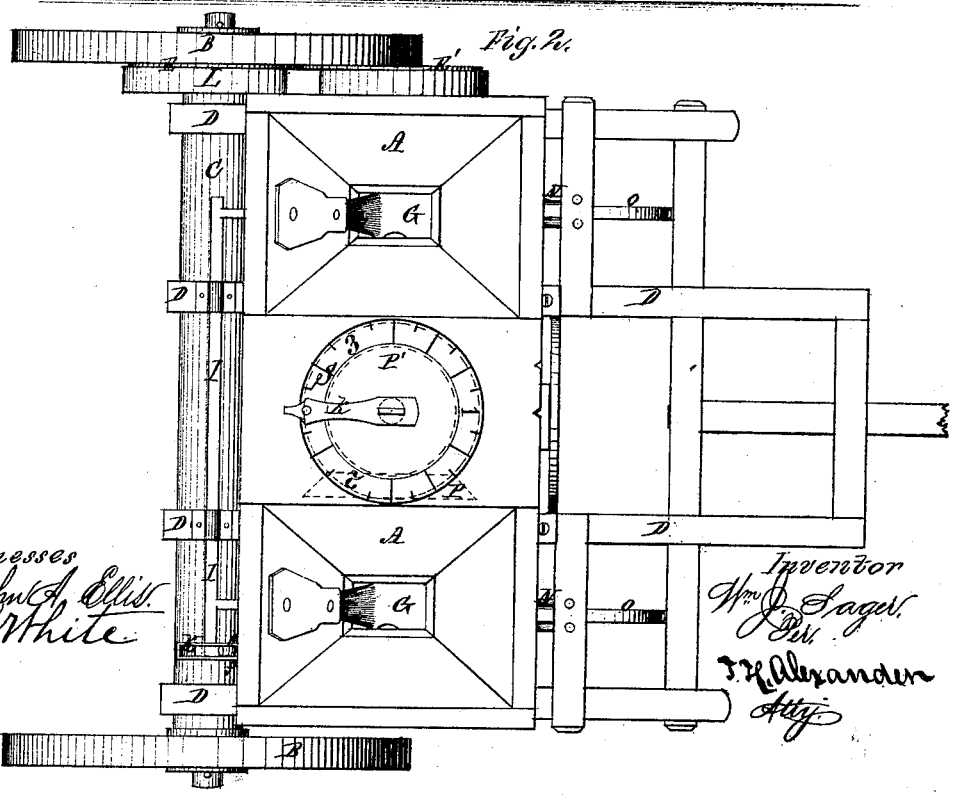

Figure 2 a plan view of my machine.

A A represent the boxes or hoppers which contain the corn.

B B are the wheels, which, in connection with the axle C and frame D, constitute the carrying parts on which the planting portion of the machine is constructed.

E E' are cog-wheels connected with the axle C and shaft F, whereby said shaft receives its motion.

On the shaft F are two droppers, G G, of hollow cylinder form, with holes which receive the corn from the boxes A A, with springs *a* and nipples *b* on the inside of each cylinder, passing under rollers or slides *d d*, thereby ejecting the corn from the holes in the cylinders or droppers G G.

H H are shields or guards attached to the board on which the boxes A A are placed, to prevent corn from dropping from the cylinders until arriving at the proper point.

I is a rocking lever connected by chains *e e* with the teeth or shovels J J which conduct the corn into the ground.

By the movement of this lever in the rack K, secured by a pin, *f*, the teeth or shovels are raised or lowered as required to suit the nature of the ground.

L is a guard attached to the frame D to protect the cog-wheels E E' from dirt.

M is a lever connected with rivets to the bars *h h*.

Throwing the top of this lever right or left puts the shaft F in or out of motion or gear at the cog-wheels E E'.

N N are guides to the springs O O, to which the shovels J J are attached, said springs keeping the shovels in the ground, and regulated, as above mentioned, by the lever I and chains *e e*.

P P' are bevel-cogs, the former on the shaft F, which has a sliding motion, and the other on the lower end of an upright shaft, R, which makes one revolution with the shaft F and cylinders G G.

At the top of the upright shaft R is attached a guide or hand, *k*, which thus makes one revolution with the shaft F and cylinders G G.

The guide or hand *k* regulates the distance in dropping in connection with the dial S, the numbers 1 2 3 on the same being the dropping points.

The cross-lines and half-lines on dial are divisions of space, from 1 to 2 representing three feet distance between dropping—the first half-line from 1 in direction of 2 represents six inches, and whole line one foot.

In operating the machine there must be a line or furrow drawn at two sides of field as guides or starting points. Setting the hand *k* at 1 and passing it round to one foot of No. 3 before putting the machine in gear at E E', the hand *k* will then move one foot to No. 3, when the machine deposits its first corn.

If, at the opposite side of field, on coming to line or furrow, the hand stands at two feet past No. 2 on dial, throw the machine out of gear, turn the team, and turn the hand back one foot; it will then pass two feet, when it will drop at No. 3, which brings it opposite the last dropping on the previous rows. The machine will then operate correctly to the other end of the field.

Having thus fully described my invention,

What I claim as new, and desire to secure by Letters Patent, is—

1. The hollow cylinder dropper G, provided with springs *a*, nipples *b*, and rollers or slides *d*, substantially as and for the purposes herein set forth.

2. In combination with shovels J and springs O, the lever I and chains *e e* with rack K and pin *f*, substantially as and for the purposes herein set forth.

3. The movable shaft F with the hollow cylinder droppers G G and cog-wheels E' and P, operated by means of the lever M, substantially as and for the purposes herein set forth.

In testimony that I claim the foregoing as my own, I affix my signature in presence of two witnesses.

WILLIAM J. SAGER.

Witnesses:
RICHD. MILES,
H. T. RYMAN.